United States Patent [19]

Feldtkeller

[11] Patent Number: 5,072,353
[45] Date of Patent: Dec. 10, 1991

[54] CIRCUIT CONFIGURATION FOR A BLOCKING OSCILLATOR CONVERTER SWITCHING POWER SUPPLY

[75] Inventor: Martin Feldtkeller, Munich, Fed. Rep. of Germany

[73] Assignee: Siemens Aktiengesellschaft, Munich, Fed. Rep. of Germany

[21] Appl. No.: 591,139

[22] Filed: Oct. 1, 1990

[30] Foreign Application Priority Data

Sep. 29, 1989 [EP] European Pat. Off. ........ 89118083.8

[51] Int. Cl.$^5$ ........................................... H02M 3/335
[52] U.S. Cl. ..................... 363/20; 363/97; 363/21
[58] Field of Search ............... 363/20, 21, 97, 56, 363/131

[56] References Cited

U.S. PATENT DOCUMENTS

| | | | |
|---|---|---|---|
| 4,564,820 | 1/1986 | Peruth et al. | 363/21 X |
| 4,864,480 | 9/1989 | Melcher | 363/21 |
| 4,885,673 | 12/1989 | Phillippe | 363/21 |
| 4,945,463 | 7/1990 | Dangschat | 363/21 X |
| 4,984,145 | 1/1991 | Dangschat et al. | 363/21 X |

FOREIGN PATENT DOCUMENTS 0144754 6/1985 European Pat. Off. .
2293738 7/1976 France .

OTHER PUBLICATIONS

Publication Joachim Wüstehube: "Schaltnetzteile" (Switching Power Supplies) Expert Verlag Grafenau, 1979.
Siemens Product Information "IC's für die Unterhaltungs-Elektronic" Aug. 87, pp. 46 to 63.

Primary Examiner—Steven L. Stephan
Assistant Examiner—Emanuel Todd Voeltz
Attorney, Agent, or Firm—Herbert L. Lerner; Laurence A. Greenberg

[57] ABSTRACT

A circuit configuration for a blocking oscillator converter switching power supply includes a switch. A transformer has a primary winding in the circuit of a direct voltage source being connected in series with the switch, and a secondary winding to be connected to a load. The transformer is magnetized in a first operating phase in which the switch is switched on and current flows in the primary winding, and is demagnetized in a second operating phase in which the switch is switched off and current flows in the secondary winding. An integratable control circuit has a demagnetization monitor detecting a voltage at a transformer winding and preventing the switched-off switch for being switched on until the feedback voltage in the blocking phase has exceeded a predetermined threshold value, and a suppression circuit blocking the turn-on enablement for the switch during a predetermined time after the beginning of the blocking phase. The fadeout time is dependent on the voltage dropping at the load, on the condition that the fadeout time is longer than a predetermined period of time at load voltages below a critical threshold value, and the fadeout time is at most as long as the predetermined period of time at load voltages that are at least as high as the critical threshold value.

14 Claims, 2 Drawing Sheets

CIRCUIT CONFIGURATION FOR A BLOCKING OSCILLATOR CONVERTER SWITCHING POWER SUPPLY

The invention relates to a circuit configuration for a blocking oscillator converter switching power supply, including a transformer having a primary winding in the circuit of a direct voltage source being connected in series with a switch, and a secondary winding which can be connected to a load, the transformer being magnetized in a first operating phase (flux phase), in which the switch is switched on and current flows in the primary winding, and demagnetized in a second operating phase (blocking phase), in which the switch is switched off and current flows in the secondary winding; and an integratable control circuit having a demagnetization monitor detecting a voltage (feedback voltage) at a transformer winding and preventing the switched off switch from being switched on until the feedback voltage in the blocking phase has exceeded a predetermined threshold value (turn-on threshold), and a suppression circuit blocking the turn-on enablement for the switch during a predetermined time (fadeout time) after the beginning of the blocking phase.

Many versions of blocking oscillator converters or flyback converters having such circuits are known. Reference is made, for instance, to the textbook edited by Joachim Wüstehube, entitled "Schaltnetzteile" [Switching power Supplies], published by Expert-Verlag in Grafenau, Federal Republic of Germany, 1979, and particularly chapter 3.3 thereof.

A blocking oscillator converter includes a transformer having a primary winding which is connected through an electric switch to a direct voltage, such as a rectified and smoothed mains voltage, and a secondary circuit which outputs a likewise rectified, smoothed voltage. In a first phase (flux phase), the switch is conducting. Current then flows in the primary circuit, and the transformer receives electrical energy and stores it magnetically. In the second operating phase, (blocking phase), the switch blocks the primary current flux, with the consequence that the polarity of the voltage at the transformer changes. Current flows in the secondary circuit, and the transformer gives up the magnetically stored energy to the consumer or load.

A new operating cycle should not begin until the transformer is completely demagnetized. The essential reason for this is that if the flux phase is initiated prematurely, then after several cycles the transformer can be driven to saturation, and the switch, which may be a bipolar transistor, is overloaded.

In order to monitor the demagnetization, a voltage (feedback voltage) is drawn from a suitable transistor winding and assures that the switch will not be switched on again, until the feedback voltage in the blocking phase changes its algebraic sign (i.e., plus or minus).

However, such a monitoring technique is not completely malfunction-free. Due to parasitic elements in the transformer, the measuring voltage oscillates with a lag at the beginning of the blocking phase. If there is a short circuit on the secondary side, such "after-ringing" can cause changes in polarity before the transformer is completely demagnetized. In order to prevent the switching transistor from responding at the oscillation-dictated zero crossovers, the trigger logic is constructed in such a way that the information of the zero crossover detector is ignored for a certain period of time (fadeout time T) after the onset of the blocking phase. When dimensioning T, various requirements must be taken into account: On one hand, the fadeout time must not be too short, because the primary circuit is damped as little as possible and correspondingly the transformer ringing only slowly fades. On the other hand, if the T values are too high, there is the danger that at a lower output load, in which case the transformer can give up its energy quickly, the actual end of the demagnetization process will not be recognized. Experience has shown that it is extraordinarily difficult to discover a fadeout time with which parasitic zero crossovers can be cleanly distinguished from demagnetization-dictated zero crossovers.

It is accordingly an object of the invention to provide a circuit configuration for a blocking oscillator converter switching power supply, which overcomes the hereinaforementioned disadvantages of the heretofore-known devices of this general type.

With the foregoing and other objects in view there is provided, in accordance with the invention, a circuit configuration for a blocking oscillator converter switching power supply, comprising a switch; a transformer having a primary winding in the circuit of a direct voltage source being connected in series with the switch, and a secondary winding to be connected to a load, the transformer being magnetized in a first operating phase in which the switch is switched on and current flows in the primary winding, and being demagnetized in a second operating phase in which the switch is switched off and current flows in the secondary winding; and an integratable control circuit having a demagnetization monitor detecting a voltage at a transformer winding and preventing the switched-off switch from being switched on until the feedback voltage in the blocking phase has exceeded a predetermined threshold value, and a suppression circuit blocking the turn-on enablement for the switch during a predetermined time after the beginning of the blocking phase; the fadeout time being dependent on the voltage dropping at the load, on the condition that the fadeout time is longer than a predetermined period of time at load voltages below a critical threshold value, and the fadeout time is at most as long as the predetermined period of time at load voltages that are at least as high as the critical threshold value.

In accordance with another feature of the invention, the first operating phase is a flux phase, the second operating phase is a blocking phase, the voltage detected by the demagnetization monitor is a feedback voltage, the predetermined threshold value is a turn-on threshold, the predetermined time is a fadeout time, and the voltage dropping at the load is a load voltage.

The invention is based on the recognition that the fadeout time T can satisfy all of these conditions, if it is made to be variable, specifically as a function of the load voltage. Ringing-dictated changes in algebraic sign can occur only at a low load voltage, or in other words in the case of a short circuit or in the startup phase. They are ignored whenever the fadeout time is long, as the invention indeed provides. Since at a low load voltage the demagnetization phase also lasts a relatively long time, a high T value is acceptable in this case. The fadeout time, in contrast, must be brief whenever the transformer gives up its energy quickly. This is the case only if the output voltage fluctuates about its set-point value, when the switching power supply or switch power pack is only slightly loaded. However, at a high output voltage, premature zero crossovers need not be feared, so that in this case the low T value prescribed by the invention enables malfunction-free signal detection. If the load voltage has approximately attained its rated value, and if the power pack is sufficiently heavily loaded, then the length of the fadeout time is not critical. This fact increases the freedom of construction in selecting a specific T function.

Certain T courses are particularly simple to attain with circuitry. This is true, for instance, for a fadeout time that assumes a first fixed value $T_1$ below a critical load voltage value $U_{LK}$ (approximately 80% of the set-point value) and then jumps back to a second fixed value $T_2$ ($T_2 < T_1$) whenever the load voltage exceeds the threshold $U_{LK}$. Without particular effort or expense, a fadeout time can also be generated that decreases with increasing load voltage and disappears completely at a critical value of the load voltage, such as the set-point value.

When generating the variable fadeout time by circuitry, it is practical to make as much use as possible of existing switching means. Thus, if possible, the signal for varying the fadeout time should be derived from a voltage that is proportional to the load voltage and is already available in the primary circuit. For instance, this voltage could be the control signal required for stabilizing the load voltage. If the switching power supply has an oscillator that oscillates in synchronism with the oscillating cycles, then it is recommended that the various T values be dimensioned in accordance with certain segments of a period of the oscillator signal.

In accordance with a further feature of the invention, the load voltage is stabilized to a set-point value, and the critical threshold value is between 70% and 100%, and preferably between 75 and 85%, of the set-point value of the stabilized load voltage.

In accordance with an added feature of the invention, the fadeout time has a minimum value when the load voltage is less than the critical threshold value, and has a maximum value when the load voltage is greater than or equal to the critical threshold value, where the minimum value is greater than the predetermined period of time which is greater than or equal to the maximum value.

In accordance with an additional feature of the invention, the fadeout time has a first fixed value corresponding to the minimum value when the load voltage is less than the critical threshold value, and has a second fixed value corresponding to the maximum value when the load voltage is greater than or equal to the critical threshold value.

In accordance with yet another feature of the invention, the integratable control circuit receives a control voltage proportional to the load voltage; the demagnetization monitor includes a zero crossover detector acted upon by the feedback voltage; and the integratable control circuit further includes a first comparator comparing the control voltage with the critical threshold value and outputting a first resultant differential voltage; a voltage divider; a transistor having a base receiving the first resultant differential voltage and a collector-to-emitter path connected through the voltage divider to a reference voltage source and connected to ground; a second comparator comparing a threshold voltage picked up from the voltage divider with a ramp voltage rising from the onset of the blocking phase and outputting a second resultant differential voltage; a zero crossover detector issuing an output signal; and a gate having a first input receiving the second resultant differential voltage and a second input receiving the output signal of the zero crossover detector; the gate passing on the output signal of the zero crossover detector indicating a zero crossover, only whenever the ramp voltage has attained the value of the threshold voltage.

In accordance with yet a further feature of the invention, there is provided a constant current source, and a capacitor being charged by the constant current source during the blocking phase and carrying the ramp voltage.

In accordance with yet an added feature of the invention, the fadeout time decreases with increasing load voltage and assumes a minimum value at the critical threshold value, the critical threshold value is preferably equivalent to the set-point value thereof given a stabilized load voltage, and the minimum value may be zero.

In accordance with yet an additional feature of the invention, the integratable control circuit includes a zero crossover detector receiving the feedback voltage and a control voltage proportional to the load voltage and issuing an output signal, a control amplifier amplifying a deviation of the control voltage from a reference value and issuing an output voltage; a comparator comparing the output voltage of the control amplifier with a ramp voltage rising from the onset of the blocking phase and outputting a resultant differential voltage; a gate having a first input receiving the resultant differential voltage and a second input receiving the output signal of the zero crossover detector; the gate passing on the output signal of the zero crossover detector indicating a zero crossover only whenever the ramp voltage has attained the value of the output voltage of the control amplifier.

In accordance with again another feature of the invention, the integratable control circuit includes an oscillator synchronized with the operating phases of the blocking oscillator converter switching power supply, the oscillator emitting a periodically oscillating oscillator voltage, and the fixed values of the fadeout time each being defined fractions of one period of the oscillator voltage.

In accordance with a concomitant feature of the invention, the fadeout time is at most as long as the critical time value only whenever the load voltage is at least as high as the critical threshold value and an ohmic resistor of the load also has a minimum value.

Other features which are considered as characteristic for the invention are set forth in the appended claims.

Although the invention is illustrated and described herein as embodied in a circuit configuration for a blocking oscillator converter switching power supply, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

For the sake of simplicity, the circuit configurations in the figures are only shown with the detail that is absolutely necessary for a comprehension of the invention. For a more detailed description of these circuits, reference should be made to the publication Siemens Product Brochure "IC's für die Unterhaltungselektronik" [IC's for Electronic Entertainment Systems], August 1987 edition, pp. 46-63, or to U.S. application Ser. No. 470,250.

Figure 1:
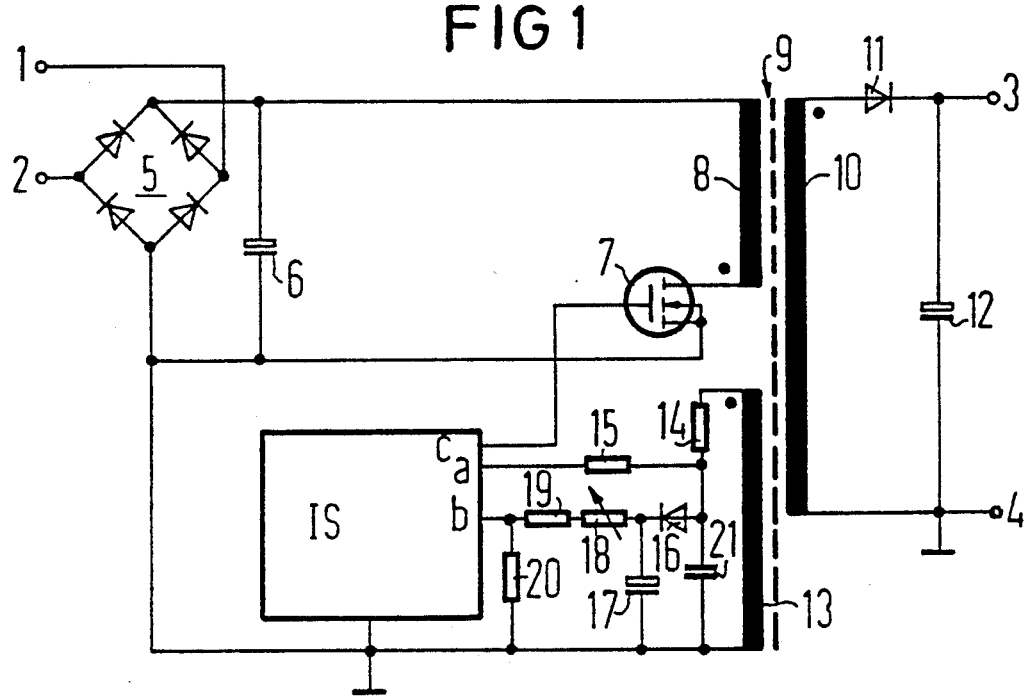
FIG. 1 is a schematic and block circuit diagram of a typical circuit configuration for a blocking oscillator converter switching power supply.

Referring now in detail to the figures of the drawing, in which elements that are equivalent to one another are provided with the same reference numerals, and first, particularly, to FIG. 1 thereof, there is seen a circuit of a free-oscillating blocking oscillator converter switching power supply, which generates a stabilized direct voltage at terminals 3 and 4 from a mains voltage applied between terminals 1 and 2. To this end, the mains voltage is first rectified in a rectifier 5, smoothed in a charge capacitor 6, and carried to a primary winding 8 of a transformer 9 through an electric switch, which in the present case is a SIPMOS transistor 7. During the conducting phase of the transistor 7, energy is magnetically stored in the transformer 9. In the blocking phase, this energy is given up to a non-illustrated consumer or load connected between the terminals 3 and 4, through a secondary winding 10 of the transformer 9. The voltage dropping at the consumer is rectified and filtered through a diode 11 and a further charge capacitor 12.

The circuit includes a trigger component or integratable control circuit IS, which in the present example is the commercially available component TDA 4605, that triggers the transistor 7 with pulse width modulation. In order to turn on the transistor, the component IS receives a first voltage signal (feedback voltage) at a pin a. This signal is supplied from a control winding 13 that is firmly coupled to the secondary winding, through resistors 14 and 15. In order to set the duty cycle, the component IS receives a control signal from the control winding at a connection or pin b. This signal is first rectified and smoothed through a diode 16 and a charge capacitor 17 and is subsequently divided downward in a voltage divider constructed of resistors 18, 19 and 20. In order to avoid a peak rectification of high-frequency components, the resistor 14 is expanded by a further capacitor 21 to make a low-pass filter. The width of an output pulse emitted at a pin c is adapted to the load of the secondary side, by comparison of the control voltage with an internal reference voltage.

Figure 2:
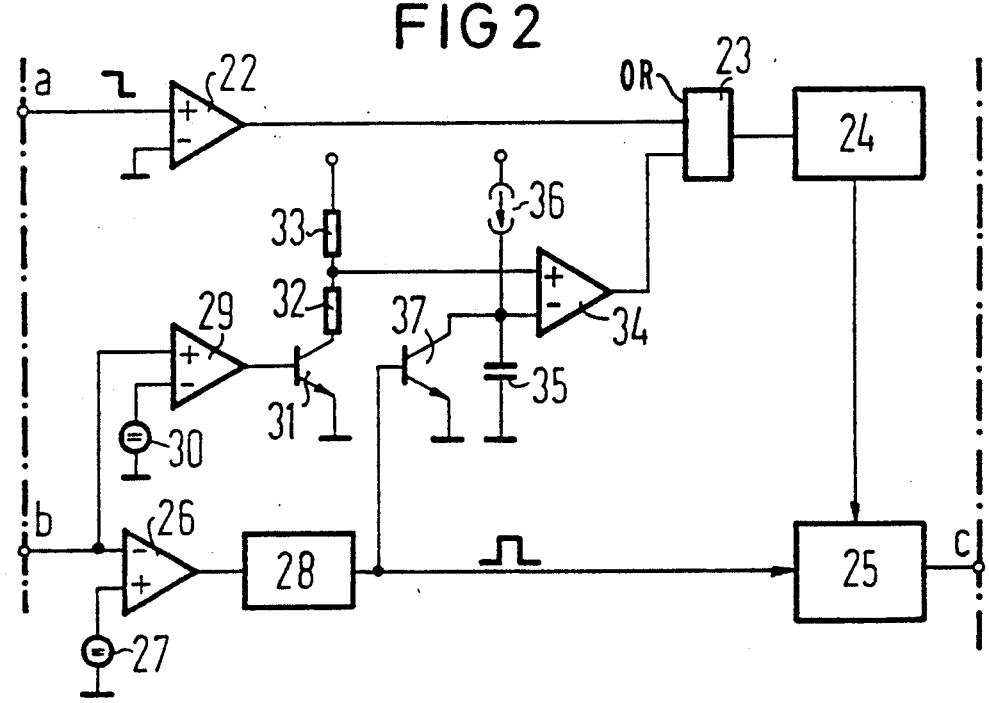
FIG. 2 is a circuit diagram showing parts of the control circuit for a first exemplary embodiment of the invention.

In order to ensure that the transistor 7 is not switched on until the energy has flowed completely out of the transformer, the transformer ringing must not be allowed to simulate demagnetization. FIG. 2 shows how ringing suppression provided according to the invention could be incorporated into the component IS. Only those elements of the component that relate to the ringing suppression are shown. Conventional components are represented merely in the form of blocks.

The feedback signal received at the pin a is fed to the positive input of a first comparator or zero crossover detector 22, the negative input of which is grounded. The comparator output is carried through a gate 23 and a demagnetization monitor 24 to an output driver 25, which furnishes trigger pulses for the transistor 7 at the pin c. At the pin b, the component IS receives the control voltage, which is carried to the negative input of a control amplifier 26. The positive input of the amplifier 26 is connected to a reference voltage source 27 that furnishes a set-point voltage $U_{soll}$. The output of the amplifier 26 is connected to the output driver 25 through a pulse width modulator 28.

A signal derived from the control voltage acts upon the positive input of a second comparator 29, having a negative input which is connected to a further reference voltage source 30 and an output which leads to the base of a transistor 31. The voltage output by the reference voltage source 30 is 0.8 $U_{soll}$. The collector of the transistor 31 is connected through two resistors 32, 33 to a fixed voltage $U_{ref}$, while the emitter thereof is connected to ground. The voltage prevailing between the resistors 32 and 33 is picked up and carried to the positive input of a third comparator 34. The negative input of the comparator 34 is connected to a capacitor 35, which is connected to ground and is charged by a constant current source 36. Connected parallel to the capacitor 35 is the collector-to-emitter path of a transistor 37, having a base being acted upon by the output of the pulse width modulator 28. The outupt of the comparator 34 leads to the gate 23, that passes on a zero crossover signal from the comparator 22, which in the present case a logical "0", only whenever the output of the comparator 34 is likewise at "0".

Element 29 may be considered a first comparator comparing the control voltage with the critical threshold value $U_{LK}$ and outputting a first resultant differential voltage. In that case, element 34 is a second comparator comparing a threshold voltage picked up from the voltage divider 32, 33 with a ramp voltage rising from the onset of the blocking phase and outputting a second resultant differential voltage, and element 22 is a zero crossover detector issuing an output signal to the gate 23 which also receives the second resultant differential voltage.

The suppression circuit functions as follows:

If the output voltage has not yet attained 80% of its set-point value, the comparator 29 blocks the transistor 31, with the consequence that the full voltage $U_{ref}$ is applied to the positive input of the comparator 34. During a preceding flux phase, the capacitor 35 was discharged through the transistor 37, and the voltage present at the negative input of the comparator 34 starts at the beginning of the blocking phase with the value of zero and rises gradually, because the transistor 37 blocks as well during the blocking phase, and thus the capacitor can be charged from the constant current source 36. At a time $$T_1 = \frac{C \times U_{ref}}{I},$$

where C=capacitance of the capacitor 35 and I=current intensity of the constant current source 36, the voltage at the negative input has attained the value at the positive input, so that the comparator 34 sends a logical "0" to the gate 23. On this condition, the gate is free to pass a logical "0" from the comparator 22, that is a zero crossover signal, to the demagnetization monitor 24. Zero crossovers are accordingly faded out during a time period $T_1$.

If the output voltage is at least 0.8 of $U_{soll}$, then the comparator 29 makes the transistor 31 conducting, with the result that only the downwardly divided voltage $R32/(R32+R33)U_{ref}$ is then present at the positive input of the comparator 34. Accordingly, the gate is shifted into a state in which it can allow a zero crossover signal to pass through it after a delay $T_2$ after the beginning of the blocking phase:

$$T_2 = \frac{R32}{R32 + R33} T_1$$

and therefore at $U_L = 0.8\ U_{soll}$, the fadeout time has the value of $T_2$. Typical $T_1$ and $T_2$ values are about 12 μsec and 4 μsec, respectively.

Figure 3:
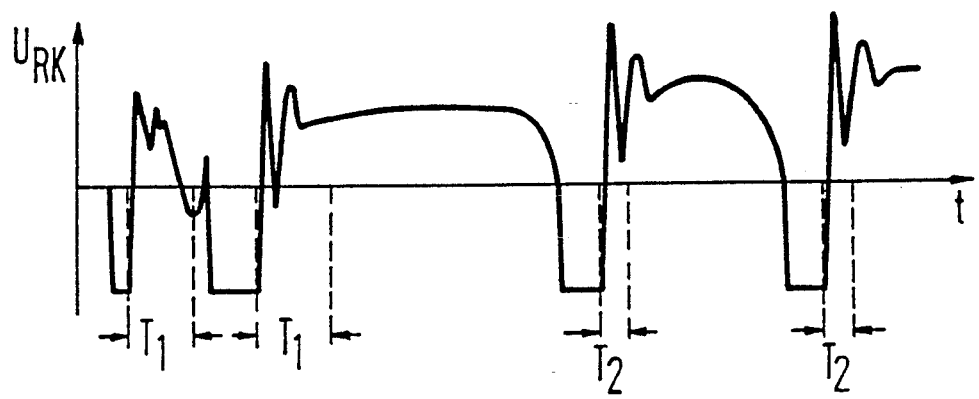
FIG. 3 is a graph of a load voltage $U_L$ as a function of time t for the exemplary embodiment of FIG. 2.

FIG. 3 shows the feedback voltage $U_{RK}$ as a function of the time t. In the first two blocking phases, the load voltage has not yet attained 80% of its set-point value. Accordingly the fadeout time has the high value $T_1$. Polarity changes brought about by transformer ringing are suppressed, while the zero crossovers tripped by the complete demagnetization can be recorded. In the ensuing operating cycles, $U_L$ has exceeded the switchover value of 0.8 $U_{soll}$. Accordingly, the fadeout time returns to the brief value $T_2$. This time is dimensioned to be even shorter than the shortest conceivable demagnetization phase, which at full load voltage in no-load operation can certainly be markedly less than 10 μsec. Ringing-dictated zero crossovers need not be feared, when the load voltage is fully stabilized.

Figure 4:
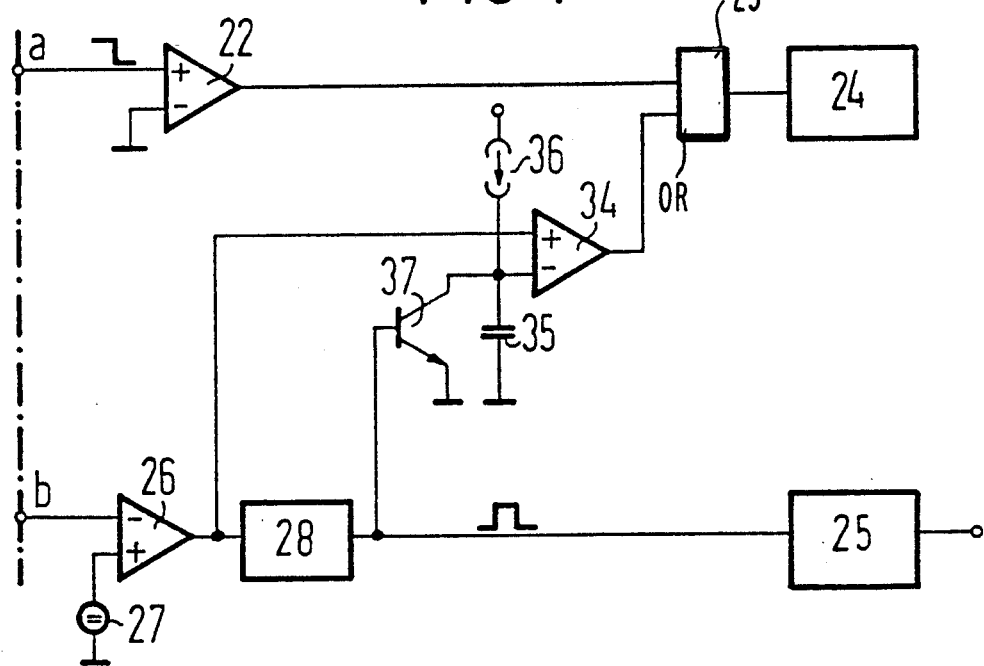
FIG. 4 is a view similar to FIG. 2 showing a further exemplary embodiment.

With the suppression circuit of FIG. 2, the fadeout time below and above a certain load voltage threshold has a respective high and a low fixed value. FIG. 4 shows a circuit variant in which the fadeout time drops linearly with a decreasing pulse width. As the drawing shows, the signal for varying the fadeout time is drawn from the output of the control amplifier 26 and is carried directly to the positive input of the comparator 34. The aforementioned T course thus comes about automatically.

Both suppression circuits can be readily incorporated into the trigger component. This kind of embodiment is particularly economical, but does not furnish very exact fadeout times, especially because the integrated constant current source value and capacitances vary. If the T values must only have low tolerances, then at least the critical portions of the suppression circuit could be achieved by means of external components, or the voltage edges required for defining the desired time periods could be generated in some other way.

Such voltage edges are available if the blocking oscillator converter operates with fixed frequency. In that case, the trigger component in fact includes an oscillator that oscillates in synchronism with the operating cycles, and the output voltage of which has a sawtooth course, with a defined period and defined period segments for the trailing and leading voltage edges. In this case it is recommended that the T values of FIG. 3 be achieved by forming $T_2$ from the trailing (short) edge and $T_1$ from the sum of the trailing edge and a certain portion of the rising edge. The circuitry used to provide this T value generation presents no difficulties and is therefore not shown in detail herein.

During the course of operation, a sudden short circuit may arise on the output side. The load voltage then breaks down to a very low value, and whenever the short circuit includes both capacitive and inductive components it initially oscillates about the short-circuiting value and in so doing may also change its algebraic sign. If such a short circuit arises before the end of the blocking phase, then the trigger logic may receive a false zero crossover signal. In order to avoid this, one could either attempt to prevent the short-circuit-dictated undershootings from occurring at all by suitably constructing the switching power supply, for instance by means of a diode connected antiparallel to the output-side smoothing capacitor, or one could attempt to ameliorate their effects, such as by selecting a transformer having sufficient reserve until saturation. Another option is to additionally shift the threshold value of the feedback voltage at which the demagnetization monitor responds to values that are attained only by the demagnetization-dictated voltage peaks. Since these voltage peaks are dependent on the instantaneous load voltage, the threshold value shift when the switching power supply is put into operation must begin at the value of zero, and it must not begin until the load voltage builds up as well. This kind of course of the turn-on threshold is the subject of co-pending application Ser. No. 591,136 having the same filing date as the instant application and being entitled Circuit Configuration for a Blocking Oscillator Converter Switching Power Supply, which should be seen for further details.

I claim:

1. Circuit configuration for a blocking oscillator converter switching power supply, comprising:
   A) a switch;
   B) a transformer having
      a) a primary winding in a circuit of a direct voltage source connected in series with said switch, and
      b) a secondary winding to be connected to a load,
      c) said transformer being magnetized in a first operating phase in which said switch is switched on and current flows in said primary winding, and being demagnetized in a second operating phase in which said switch is switched off and current flows in said secondary winding; and
   c) an integratable control circuit having
      a) a demagnetization monitor detecting a voltage at a transformer winding and preventing said switched-off switch from being switched on until the feedback voltage in the blocking phase has exceeded a predetermined threshold value, and
      b) a suppression circuit blocking the turn-on enablement for said switch during a predetermined time after the beginning of the blocking phase;
      c) the predetermined time being a fadeout time dependent on the voltage drop at the load, on the condition that
      d) the fadeout time is longer than a predetermined period of time at load voltages below a critical threshold value, and the fadeout time is at most as long as the predetermined period of time at load voltages that are at least as high as the critical threshold value.

2. Circuit configuration according to claim 1, wherein the first operating phase is a flux phase, the second operating phase is a blocking phase, the voltage detected by the demagnetization monitor is a feedback voltage, the predetermined threshold value is a turn-on threshold, and the voltage drop at the load is a load voltage.

3. Circuit configuration according to claim 2, wherein the load voltage is stabilized to a set-point value, and the critical threshold value is between 70% and 100% of the set-point value of the stabilized load voltage.

4. Circuit configuration according to claim 2, wherein the load voltage is stabilized to a set-point value, and the critical threshold value is between 75 and 85% of the set-point value of the stabilized load voltage.

5. Circuit configuration according to claim 2, wherein the fadeout time has a minimum value when the load voltage is less than the critical threshold value, and has a maximum value when the load voltage is greater than or equal to the critical threshold value, where the minimum value is greater than the predetermined period of time which is greater than or equal to the maximum value.

6. Circuit configuration according to claim 5, wherein the fadeout time has a first fixed value corresponding to the minimum value when the load voltage is less than the critical threshold value, and has a second fixed value corresponding to the maximum value when the load voltage is greater than or equal to the critical threshold value.

7. Circuit configuration according to claim 6, wherein said integratable control circuit receives a control voltage proportional to the load voltage; said demagnetization monitor includes a zero crossover detector acted upon by the feedback voltage; and said integratable control circuit further includes a first comparator comparing the control voltage with the critical threshold value and outputting a first resultant differential voltage; a voltage divider; a transistor having a base receiving the first resultant differential voltage and a collector-to-emitter path connected through said voltage divider to a reference voltage source and connected to ground; a second comparator comparing a threshold voltage picked up from the voltage divider with a ramp voltage rising from the onset of the blocking phase and outputting a second resultant differential voltage; a zero crossover detector issuing an output signal; and an or gate having a first input receiving the second resultant differential voltage and a second input receiving the output signal of said zero crossover detector; said or gate passing on the output signal of said zero crossover detector indicating a zero crossover, only whenever the ramp voltage has attained the value of the threshold voltage.

8. Circuit configuration according to claim 7, including a constant current source and a capacitor being charged by said constant current source during the blocking phase and carrying the ramp voltage.

9. Circuit configuration according to claim 2, wherein the fadeout time decreases with increasing load voltage and assumes a minimum value at the critical threshold value.

10. Circuit configuration according to claim 9, wherein the critical threshold value is equivalent to the set-point value thereof when the load voltage is stabilized.

11. Circuit configuration according to claim 9, wherein the minimum value is zero.

12. Circuit configuration according to claim 9, wherein said integratable control circuit includes a zero crossover detector receiving the feedback voltage and a control voltage proportional to the load voltage and issuing an output signal, a control amplifier amplifying a deviation of the control voltage from a reference value and issuing an output voltage; a comparator comparing the output voltage of the control amplifier with a ramp voltage rising from the onset of the blocking phase and outputting a resultant differential voltage; an or gate having a first input receiving the resultant differential voltage and a second input receiving the output signal of said zero crossover detector; said or gate passing on the output signal of said zero crossover detector indicating a zero crossover only whenever the ramp voltage has attained the value of the output voltage of said control amplifier.

13. Circuit configuration according to claim 6, wherein said integratable control circuit includes an oscillator synchronized with the operating phases of the blocking oscillator converter switching power supply, said oscillator emitting a periodically oscillating oscillator voltage, and the fixed values of the fadeout time each being defined fractions of one period of the oscillator voltage.

14. Circuit configuration according to claim 1, wherein the fadeout time is at most as long as the critical time value only whenever the load voltage is at least as high as the critical threshold value and an ohmic resistor of the load also has a minimum value.

* * * * *